(12) United States Patent
Jardine-Skinner et al.

(10) Patent No.: US 8,650,479 B2
(45) Date of Patent: Feb. 11, 2014

(54) GUIDED ATTACHMENT OF POLICIES IN A SERVICE REGISTRY ENVIRONMENT

(75) Inventors: Evan G. Jardine-Skinner, Southampton (GB); David J. Seager, Eastleigh (GB); Ian M. Shore, Crampmoor (GB)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/849,542

(22) Filed: Aug. 3, 2010

(65) Prior Publication Data

US 2011/0047451 A1 Feb. 24, 2011

(30) Foreign Application Priority Data

Aug. 5, 2009 (EP) ..................................... 09167272

(51) Int. Cl.
*G06F 17/00* (2006.01)
(52) U.S. Cl.
USPC ............................. 715/234; 715/205; 726/26
(58) Field of Classification Search
USPC ................. 715/234, 205; 726/26, 1
See application file for complete search history.

(56) References Cited

U.S. PATENT DOCUMENTS

| 2006/0075465 A1 | 4/2006 | Ramanathan et al. |
| 2006/0212574 A1 | 9/2006 | Maes |
| 2007/0124797 A1* | 5/2007 | Gupta et al. ...................... 726/1 |
| 2008/0066189 A1 | 3/2008 | Liu et al. |
| 2008/0244693 A1* | 10/2008 | Chang .............................. 726/1 |
| 2009/0083239 A1* | 3/2009 | Colgrave et al. ................. 707/4 |
| 2009/0165142 A1* | 6/2009 | Adelstein et al. ............... 726/26 |
| 2010/0205144 A1* | 8/2010 | Barton et al. ................. 707/608 |

OTHER PUBLICATIONS

Sitaraman Lakshminarayanan, Oracle Web Services Manager, Jun. 2008.*
Siddarth Bajaj, Web Services Policy 1.2—Attachment (WS-PolicyAttachment), Apr. 2006.*
Asir Vedamuthu, Understanding Web Services Policy, Jul. 2006.*
Siddharth Bajaj, Web Services Policy 1.2—Framework (WS-Policy), Apr. 2006.*

* cited by examiner

*Primary Examiner* — Cesar Paula
*Assistant Examiner* — Howard Cortes
(74) *Attorney, Agent, or Firm* — DeLizio Gilliam, PLLC (57) ABSTRACT

A computer program product and an apparatus for policy attachment are described. A reference to a selected description document for policy attachment is received, wherein the selected description document includes at least one definition to describe a Web Service. A logical object of the selected description document that permit policy attachment is located. A reference to the logical object that is located for policy attachment is received. At least one policy that is operable to be associated with the logical object that is referenced is located, wherein the at least one policy defines a rule for the Web Service. A reference for a selected policy from among the at least one policy is received. The selected policy is attached to the selected description document.

10 Claims, 7 Drawing Sheets

GUIDED ATTACHMENT OF POLICIES IN A SERVICE REGISTRY ENVIRONMENT

RELATED APPLICATIONS

This application claims the priority benefit of European Patent Application No. 09167272.5 filed Aug. 5, 2009, entitled "Guided Attachment of Policies in a Service Registry Environment."

BACKGROUND

Service oriented architecture (SOA) is a business-driven IT architectural approach that supports integrating the business as linked, repeatable business tasks, or services. The basic building block is a service document that defines a service so that it can be managed with other services. A service document contains information about a service including the location of the service and details about the service and how to access the service. Service documents are used by analysts, architects, and developers during a Development Phase of the SOA life cycle to locate services to reuse and to evaluate the impact of changes to service configurations. Service documents are variously described as metadata, objects, descriptions, entities and artifacts.

A service repository stores the service document and allows access to the service document and thereby the corresponding service. A service registry is an index of a subset of information about a service (for example the location and name of service document) enabling the corresponding service document to be located and accessed in a repository (or even the corresponding service located at the service provider). An integrated service registry and repository allows a service operation to use both the indexed service information in the registry and the detailed service information in the repository. An example of an integrated service registry and repository is IBM® WebSphere® Registry and Repository (WSRR).

Such an integrated service registry and repository has advantages of greater business agility and resilience through reuse than separate systems. Further advantages of looser coupling, greater flexibility, better interoperability, and better governance arise from the integration. These advantages are addressed by separating service descriptions from their implementations, and using the service descriptions across the life cycle of the service. Standards-based service metadata artifacts, such as Web Service Definition Language (WSDL), extensible mark-up language (XML) schema, policy or Service Component Architecture (SCA) documents, capture the technical details of what a service can do, how it can be invoked, or what it expects other services to do. Semantic annotations and other metadata can be associated with these artifacts to offer insight to potential users of the service on how and when it can be used, and what purposes it serves.

A policy is a rule that is applied to an object by an environment. For instance, access to an object can be controlled by applying a rule that only entities with a certain token can have access to the object. W3C (World Wide Web Consortium) is a community working together to develop interoperable internet technology.

WS-Policy is a W3C WS (Web Service) standard that is intended to provide a means for specifying policies that need to be applied to Web Services and specifically service documents. The WS-Policy-Attach specification (also controlled by the W3C) specifies a standard means by which policy attachments can be defined to link a policy to a service object referenced in a service document. Service objects or logical objects are derived from documents (WSDL (Web Service Definition Language) documents; XSD (XML schema definition) documents; XML (extensible mark-up language) documents, WS-Policy documents etc.) when they are loaded into the Service Registry environment. The WS-Policy-Attach specification declares different means of specifying policy attachments that link specific policies to target subjects: embedded policies in WSDL documents; embedded policy references in WSDL documents; embedded policy references from policyURI (Universal Resource Indicator) attributes in WSDL documents; embedded policies in external policy attachment files; and embedded policy references in external policy attachment files.

A Policy can be a generic policy as defined in the WS-Policy Framework or it can be a domain specific policy as defined in a policy domain. If a policy is domain specific then it will specify the WSDL Elements to which it can be attached.

One problem when specifying policy attachments is the complexity of the semantics required to correctly specify the attachment. For instance an identifier for a policy can comprise two or more parts: a namespace; a WSDL element type; and actual element name. Another problem users face is an array of choices when it comes to attaching policies to subjects but no easy way of identifying the right subjects to attach the policies too. A further problem for a user that has found an element there is no easy way to see which policies can be attached to it. All these problems can quickly lead to the creation of either invalid or incorrect policy attachment documents.

SUMMARY

In some example embodiments, a computer program product for policy attachment includes a computer readable storage medium having computer readable program code embodied therewith. The computer readable program code is configured to receive a reference to a selected description document for policy attachment, the selected description document including at least one definition to describe a Web Service. The computer readable program code is configured to locate a logical object of the selected description document that permits policy attachment. The computer readable program code is configured to receive a reference to the logical object that is located for policy attachment. The computer readable program code is configured to locate at least one policy that is operable to be associated with the logical object that is referenced, wherein the at least one policy defines a rule for the Web Service. The computer readable program code is configured to receive a reference for a selected policy from among the at least one policy. The computer readable program code is configured to attach the selected policy to the selected description document.

In some example embodiments, an apparatus includes a processor. The apparatus also includes a document reference receiver executable on the processor and operable to receive a reference to a selected description document for policy attachment. The selected description document includes at least one definition to describe a Web Service. The apparatus includes an object list builder executable on the processor and operable to locate a logical object of the selected description document that permits policy attachment. The apparatus includes an attach policy receiver executable on the processor and operable to receive a reference to the logical object that is located for policy attachment. The apparatus includes a policy locator executable on the processor and operable to locate at least one policy that is operable to be associated with the logical object that is referenced, wherein the at least one policy defines a rule for the Web Service. The apparatus also includes a policy receiver executable on the processor and operable to receive a reference for a selected policy from among the at least one policy. The apparatus includes a policy attacher executable on the processor and operable to attach the selected policy to the selected description document.

BRIEF DESCRIPTION OF THE DRAWINGS

The present embodiments may be better understood, and numerous objects, features, and advantages made apparent to those skilled in the art by referencing the accompanying drawings.

Embodiments are now be described, by means of example only, with reference to the accompanying drawings in which.

DESCRIPTION OF EMBODIMENT(S)

Some example embodiments include a service registry and repository for service documents based on IBM WebSphere Service Registry and Repository. Such service documents include traditional internet services that use a range of protocols and are implemented according to a variety of programming models.

Figure 1:
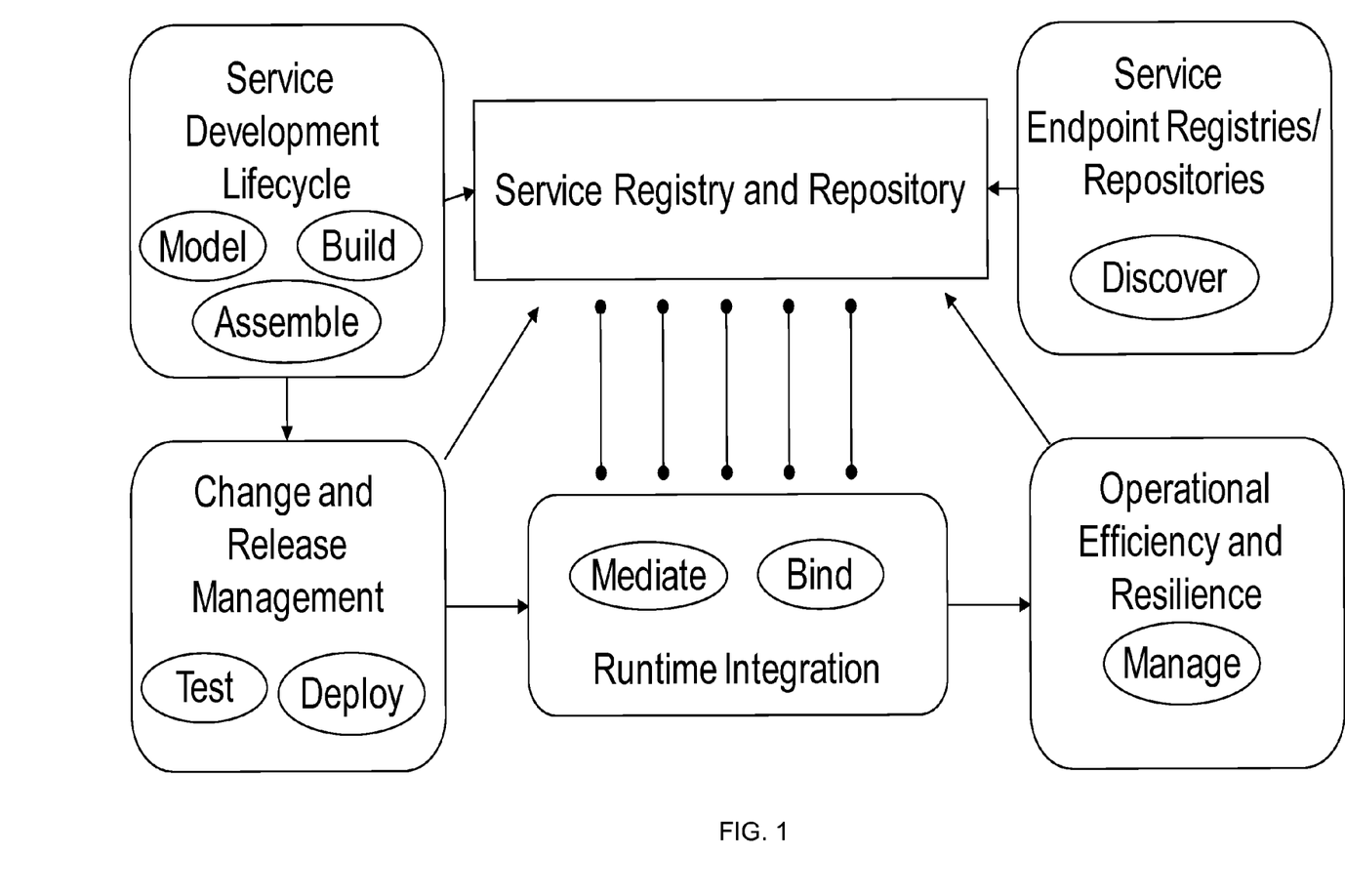
FIG. 1 is a schematic of service document phases in a service registry and repository, according to some example embodiments.

FIG. 1 is a schematic of service document phases in a service registry and repository, according to some example embodiments. In particular, FIG. 1 illustrates service life cycle phases of the services stored as documents in the service registry and repository comprising: Service Development; Change and Release Management; and Runtime Integration and Operation. As the integration point for service metadata, the service registry and repository establishes a central point for finding and managing service metadata acquired from a number of sources, including service application deployments and other service metadata and endpoint registries and repositories. The service registry and repository is where service metadata that is scattered across an enterprise is brought together to provide a single, comprehensive description of a service. Once this happens, visibility is controlled, versions are managed, proposed changes are analyzed and communicated, usage is monitored and other parts of the service architecture can access service metadata with the confidence that they have found the copy of record.

Software Architecture

Figure 2:
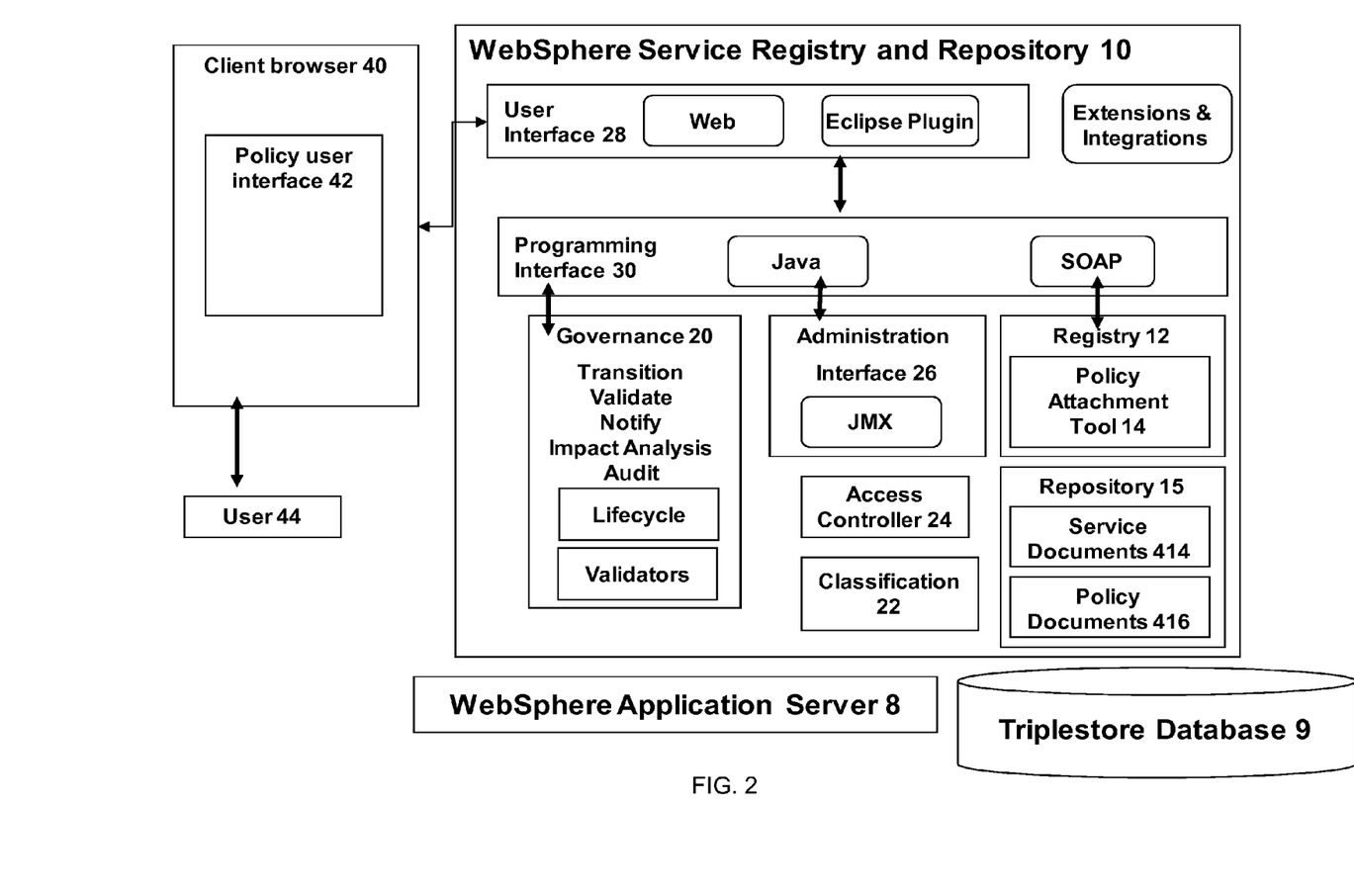
FIG. 2 is a schematic of an architecture having a service registry and repository, according to some example embodiments.

The service registry and repository, in accordance with some example embodiments, is a Java™ 2 Platform Enterprise Edition (J2EE) application that runs on a WebSphere Application Server 8 and uses a triplestore database 9 as a backing store to persist the service metadata. The service registry and repository takes advantage of the role-based access control so that role-based views and access control can be turned on when the service registry and repository is deployed as an enterprise-wide application.

FIG. 2 is a schematic of an architecture having a service registry and repository, according to some example embodiments. In particular in FIG. 2, top level components of the service registry and repository 10 comprise: a registry 12; repository 15; a governance 20; an administration interface 26; a user interface 28; a programming interface 30.

The registry 12 offers both registry function and repository function for service metadata. The repository function allows users to store, manage and query service metadata artifacts holding service descriptions. It not only takes good care of the documents containing service metadata by reliable persistence of the data, but it also provides a fine-grained representation of the content of those documents (for example, ports and portTypes in some service documents). The registry function makes provision for decorating registered service declarations and elements of the derived content models with user-defined properties, relationships, and classifiers. The registry 12 provides a policy attachment tool 14. In use client browser 40 displays policy user interface document 42 for editing by user 44.

In some example embodiments, repository 15 stores all artifacts including policy documents 414 and domain policy definitions 416.

Classification component 22 allows service descriptions and parts of service definitions to be annotated with corporate vocabulary and to capture the governance state. Service classification systems are captured in web ontology language (OWL) documents that are loaded into the Service Registry and Repository using the administrative interface. Service registry and repository entities can be classified with values from these classification systems, to allow classification-based queries to be performed, and to allow access restrictions based on classification.

Access controller 24 supports a fine-grained access control model that allows for the definition of which user roles can perform specific types of actions on corresponding artifacts. Visibility of services can be restricted by business area and user roles can be restricted from transitioning services to certain life cycle states. This is in addition to the role-based access control provided by the service registry and repository.

Administration interface 26 supports the import and export of repository content for exchange with other repositories and provide an API for configuration and basic administration. These support interactions with the Access Controller and with the Classifier User interface 28 comprises a web interface and an Eclipse* plug-in interface to enable interaction with service registry and repository. A servlet based web user interface (UI) supports is the main way for users representing different roles to interact with the service registry and repository. The web interface can support all user roles, offering lookup, browse, retrieve, publish, and annotate capabilities, as well as governance activities, such as import/export and impact analysis. A subset of this user interface is offered as an Eclipse plug-in to meet developer needs and analyst users needs that use Eclipse-based tooling. The Eclipse plug-in is used primarily for lookup, browse, retrieve and publish capabilities. The Web-based user interface can also be used for performing service metadata management and governance.

Programming interface 30 uses Java and SOAP (Service Oriented Architecture Protocol) APIs to interact programmatically with registry and repository core 12. These APIs provide basic create, retrieve, update and delete (CRUD) operations, governance operations, and a flexible query capability. The SOAP API is used to communicate content using XML data structures. The Java API is used to communicate content using service data object (SDO) graphs. Using either the user interface 30 or the programming interface 28 documents and concepts managed by WSRR can be created, retrieved, updated and deleted. However, logical entities in the logical model cannot be modified and these can only be changed by updating a document that contains the logical entity. Concepts can be created, retrieved and deleted.

The service registry and repository of some example embodiments supports two application programming interfaces (APIs) that can be used to interact with the registry 12; repository 15; the governance component 20 and the administration interface 26: a Java-based API and a SOAP-based API respectively. Both APIs support publishing (creating and updating) service metadata artifacts and metadata associated with those artifacts, retrieving service metadata artifacts, deleting metadata, and querying the content of the registry and repository. The programming APIs use Service Data Objects (SDO) to capture the data graphs inherent in the content model, allowing access to physical documents, logical parts of the physical documents, and concepts. The SOA API uses XML documents to similarly represent Service Data Objects to communicate content structures in both the physical and logical model.

Information Architecture

Figure 3:
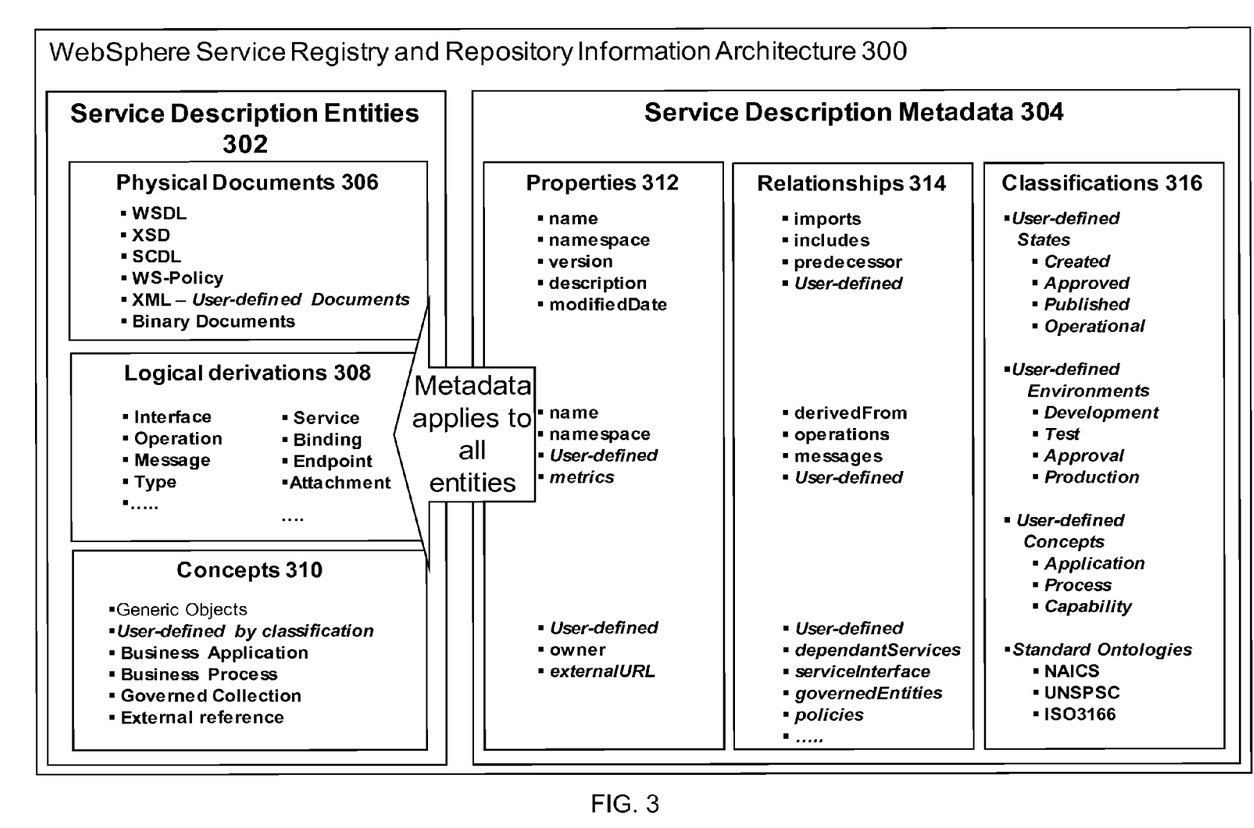
FIG. 3 is a schematic of a service registry and repository information architecture, according to some example embodiments.

FIG. 3 is a schematic of a service registry and repository information architecture, according to some example embodiments. In FIG. 3, the information architecture 300, in accordance with some example embodiments, is described. Broadly, information architecture 300 has entities representing service description entities 302 and service description metadata 304. In some example embodiments, all artifacts have an assigned URI, a name and a description. Examples of each type of artifact are shown in FIG. 3 but are not necessarily referred to in the description.

Service Description Entities 302 comprise physical documents 306; logical derivations 308 and concepts 310. Physical Documents 306 are XML documents that are known as service metadata artifacts. Logical derivations 308 are the finer-grained pieces of content that result when some types of physical document are shredded as they are loaded into Registry and Repository. Concepts 310 are generic entities that are usually typed, and represent anything that is not represented by a document in Registry and Repository. All three types of service description entities can be used in queries, have service annotations applied, and have relationships established from and to them.

The most elemental building blocks for the WSRR are the physical documents 306 such as XSD, WSDL or WS-Policy documents. In addition any XML service metadata artifact type or binary document can be stored in WSRR and receive the benefits of broader visibility, reuse, management, and governance. The coarse-grained model made up from registry objects that represents those documents is referred to as the physical model. Documents are versionable objects in the WSRR content model, which means that in addition to a URI, name, and description, they also can have a version property.

For some of the physical document types, WSRR derives logical objects and stores them in logical derivations 308. For instance, WSRR can "shred" a document upon receipt into a set of logical objects to enable users to explore WSRR content beyond the boundaries of the files stored. In some example embodiments, logical objects are not versionable. For some physical document types, WSRR defines predefined properties and detects relationships to other physical documents. An XSD document, for example, has a target Namespace property and the relationships with other imported XSD documents, other redefined XSD documents and other included XSD documents. When an entry for a certain physical document is created in WSRR, it is inspected for relationships to other artifacts. If not already represented in WSRR, a related artifact is also added, and in either case the relationship between the artifacts is recorded.

The set of logical derivations comprises the logical model of WSRR. The logical model has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. It is important to note that all individual results of document shredding are aggregated into one logical model that represents not only the content of individual documents, but also relationships between content in different documents.

WSRR stores other types of service metadata using the XML Document, a generic document type. Documents of type XMLDocument are not decomposed into the logical model.

WSRR uses a concept to represent anything that does not have a physical document. Concepts 310 are used to represent a reference to content in some other metadata repository, such as a portlet in a portlet catalogue or an asset in an asset repository. It can also be used to group physical artifacts together to govern them as a unit; for example, concepts can be versioned.

In addition to content directly related to entities 302, WSRR supports a number of metadata types that are used to describe entities 302. These metadata types are referred to as service description metadata 304. WSRR supports three types of service semantic metadata types: properties 312; relationships 314; and classifications 316. All three types describe physical model entities, logical model entities, and/or concepts. For example, service description metadata can be used to associate a property "businessValue" with a physical model entity representing a WSDL file. It might also be used to define a new relationship "makesUseOf" between an entity in the logical model representing a "portType" and an entity in the physical model representing an XML document. Furthermore one could create a classification of "importantThings" and associate it with a "port" entity in the logical model and with an entity in the physical model representing a "Policy" document. This enables semantic queries to target individual elements of the service metadata, and meaningful dependency analyses to take place prior to making changes.

Properties 312 are simple name/value pairs that are associated with any of the Service Description Entities 302. Some properties are assigned by the system, such as the unique id, the owner, and the last time the service entity was changed. These system-assigned properties cannot be changed. Others are derived through the "shredding" of a key-type service description document into its logical model. Properties of this type include name and namespace. Sometimes these system-assigned values are allowed to be changed and properties can be created. Such a user-defined property can be used as a simple, unstructured and untyped extension mechanism.

Properties 312 can be used in queries, and can be used to establish fine-grained access control.

Relationships 314 tie together one source service description entity to one or more target service description entities. Every relationship can be given a name and a source is only allowed to have a single relationship with a given name. Some relationships are assigned by WSRR during the "shredding" of key types of documents. The relationship established between XSD documents based on the importing of one into the other is one such system-assigned relationship. Relationships can also be user defined. For example, a user can: relate a concept that represents an external object to a service using a user defined relationship; relate all of the service description documents that will be governed as a unit to a governable entity; and/or relate a monitoring policy to a service endpoint.

A user can load classification 316 into registry where it can then be used to apply semantic meaning to service description entities 302. Classification systems are documents encoded using the Web Ontology Language (OWL). The registry represents OWL Classes as classifiers and interprets the subTypeOf relationship between those Classes as establishing a classifier hierarchy. Other OWL concepts such as data or relationship representing properties or other built-in OWL relationships are ignored. A classification system is imported into the registry as a whole and updates are made by importing a modified version of the ontology. Any class in the underlying ontology can be used as a classification; the same classification can be used to classify multiple entities and an entity can be associated with multiple classifications.

Policy Attachment Tool

Figure 4:
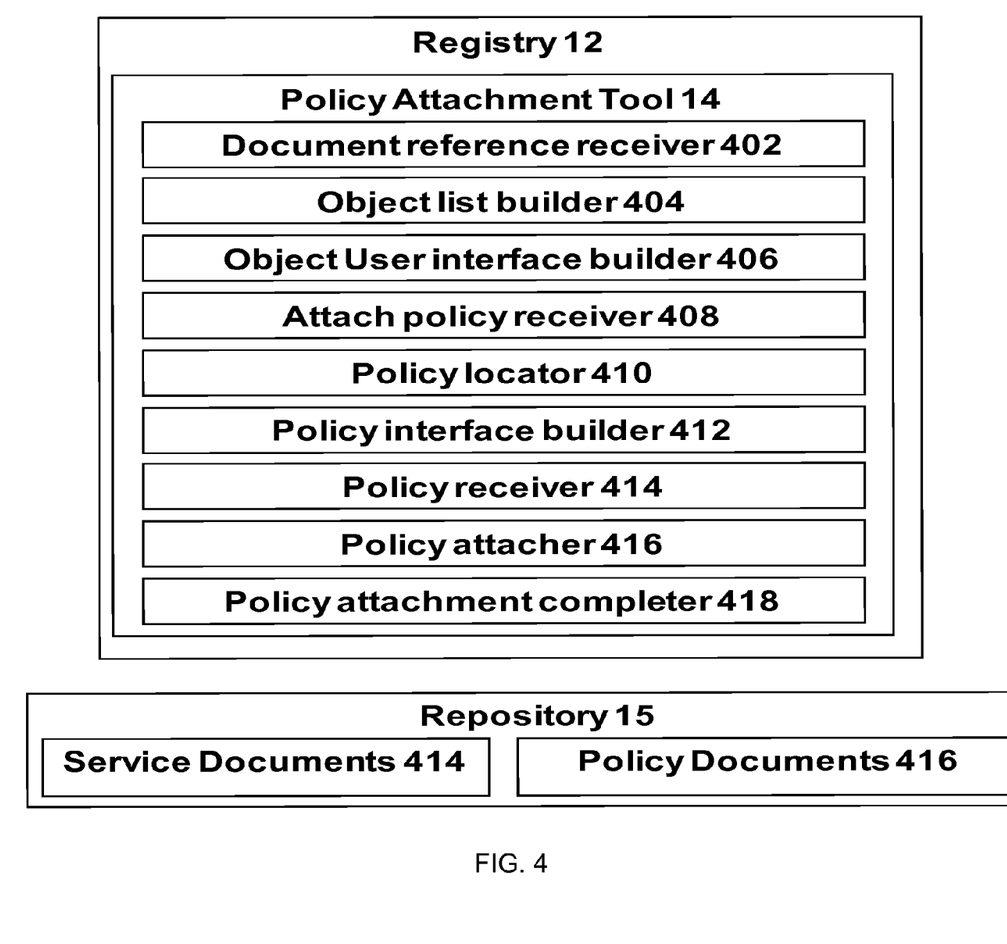
FIG. 4 is a schematic of a system having registry that includes a policy attachment tool, according to some example embodiments.

FIG. 4 is a schematic of a system having registry that includes a policy attachment tool, according to some example embodiments. In FIG. 4, there is shown a policy attachment tool 14 comprising: document reference receiver 402; object list builder 404; object user interface builder 406; attach policy receiver 408; policy locator 410; policy interface builder 412; policy receiver 414; policy attacher 416; and policy attachment completer 418.

Document reference receiver 402 acquires a WSDL document reference selected by the user. A user selects a WSDL document for a policy attachment by sending an http request to the policy attachment tool 14 containing a reference to the WSDL document.

Object list builder 404 locates all the logical objects of the selected WSDL document as defined in the repository and builds a list from them. Each of the logical objects represents an element in the selected WSDL document.

Object User interface builder 406 presents the located logical objects to the user as a marked up list along with hypertext markup options to attach policies. On selection of a hypertext markup option an http request is made to the editing tool requesting that a particular object have a policy attached to it.

Attach policy receiver 408 listens for user selection of one or more logical objects with a view of attaching a policy. In this embodiment, the attach policy receiver receives an http request for attachment of a policy to a selected object.

Policy locator 410 searches all policies (that is logical objects in the repository that define policies) in order to locate policies that may be associated with the selected logical object. Only some policies are suitable for attachment to some types of logical object and a smaller subset of policies depend on properties of a logical object. The type and properties of the object are checked against the available policies.

Policy interface builder 412 presents a list of the suitable policies to the user. In some example embodiments, a search bar with type ahead search is used but in other embodiments a drop down list is used.

Policy receiver 414 listens for a user selection of a policy from the list of located policies.

Policy attacher 416 attaches the selected policy to the selected object by creating a policy attachment document that references both the policy document and the logical object to which it is associated.

Policy attachment completer 418 listens for user input as to whether policy is completed. In some example embodiments, the policy interface builder includes a button marked "finish" that sends a finish message back to the tool. When this finish message is received then the session is ended.

Policy Attaching

Figure 5:
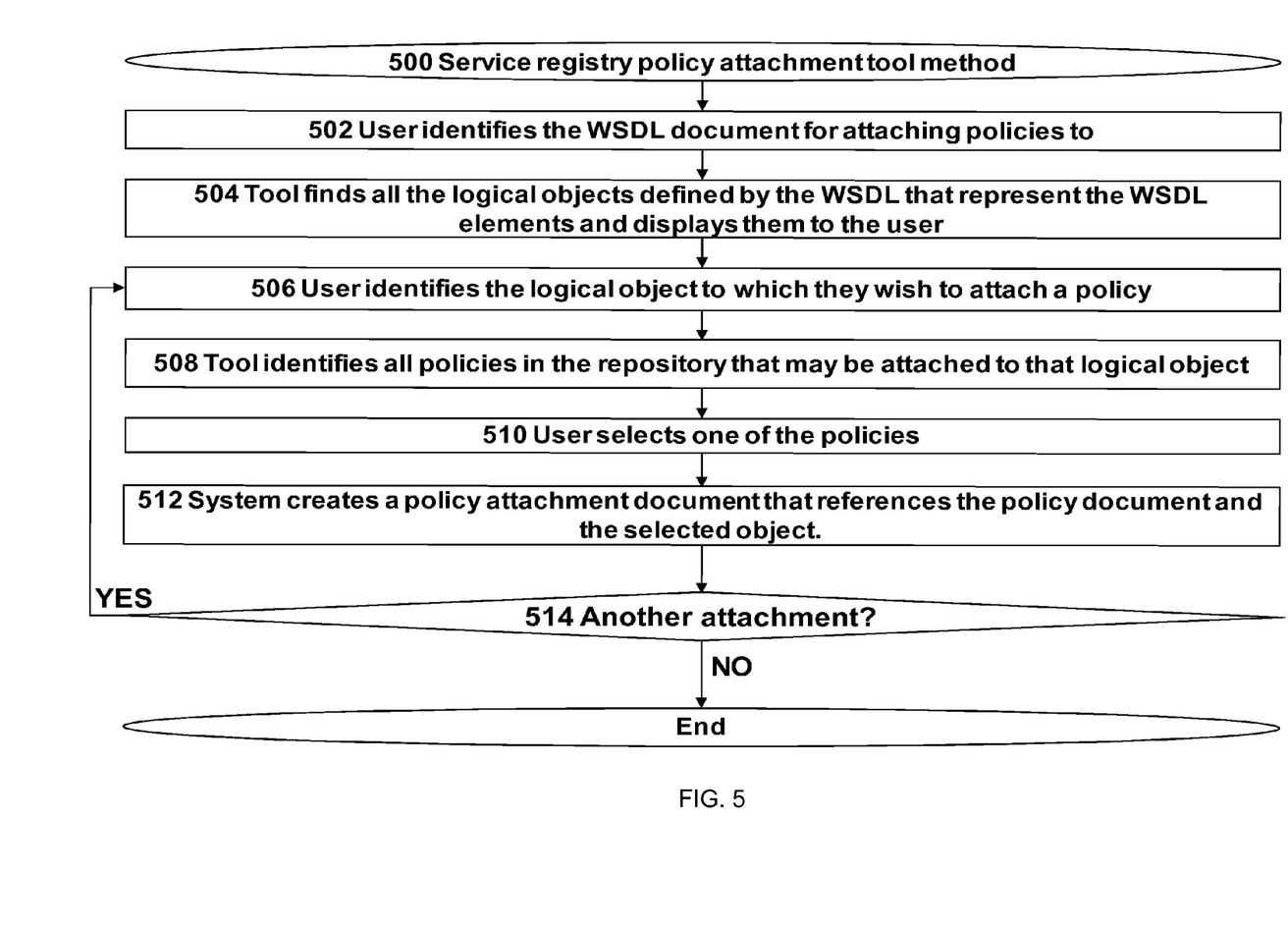
FIG. 5 is a flowchart for attaching a policy to an object of a description document, according to some example embodiments.

FIG. 5 is a flowchart for attaching a policy to an object of a description document, according to some example embodiments. In FIG. 5, there is shown a method 500 of the policy attachment tool 14 according to some example embodiments.

At block 502, a user selects a WSDL document for a policy attachment by sending an HTTP request to the policy attachment tool 14 containing a reference to the WSDL document. In another embodiment a page of documents might be presented to a user so that a particular document might be selected.

At block 504, the policy attachment tool locates all the logical objects of the selected WSDL document as defined in the repository. If necessary the document is shredded to create logical objects in the repository. Each of the logical objects represents an element in the selected WSDL document. The located logical objects are presented to the user as a list.

At block 506, the user selects one or more logical objects with a view of attaching a policy.

At block 508, the tool searches all policies (that is logical objects in the repository that define policies) in order to locate policies that may be associated with the selected logical object. Only some policies are suitable for attachment to some types of logical object and a smaller subset of policies depend on properties of a logical object. The type and properties of the object are checked against the available policies. A list of the suitable policies is created and presented to the user.

At block 510, the user selects a policy from the list of located policies. In some example embodiments, a search bar with type ahead search is used but in other embodiments a drop down list is used.

At block 512, the tool attaches the policy to the document. In some example embodiments, the tool creates a policy attachment document that references the policy document and the logical object to which it is associated. Such an operation allows both the WSDL document and the Policy document to remain unchanged.

At block 514, the tool receives input from the user as to whether another policy is to be attached to an object and returns to block 506 if this is true. If no more attachments are to be made then the method ends.

Example

The policy editing tool, in accordance with some example embodiments, allows the user to select the WDSL element (subject) for attaching a policy to, and then to search the registry for a policy that to attach to the subject. Only policies that are defined as being allowed to be attached to the specific type of WSDL element will be presented to the user.

Figure 6:
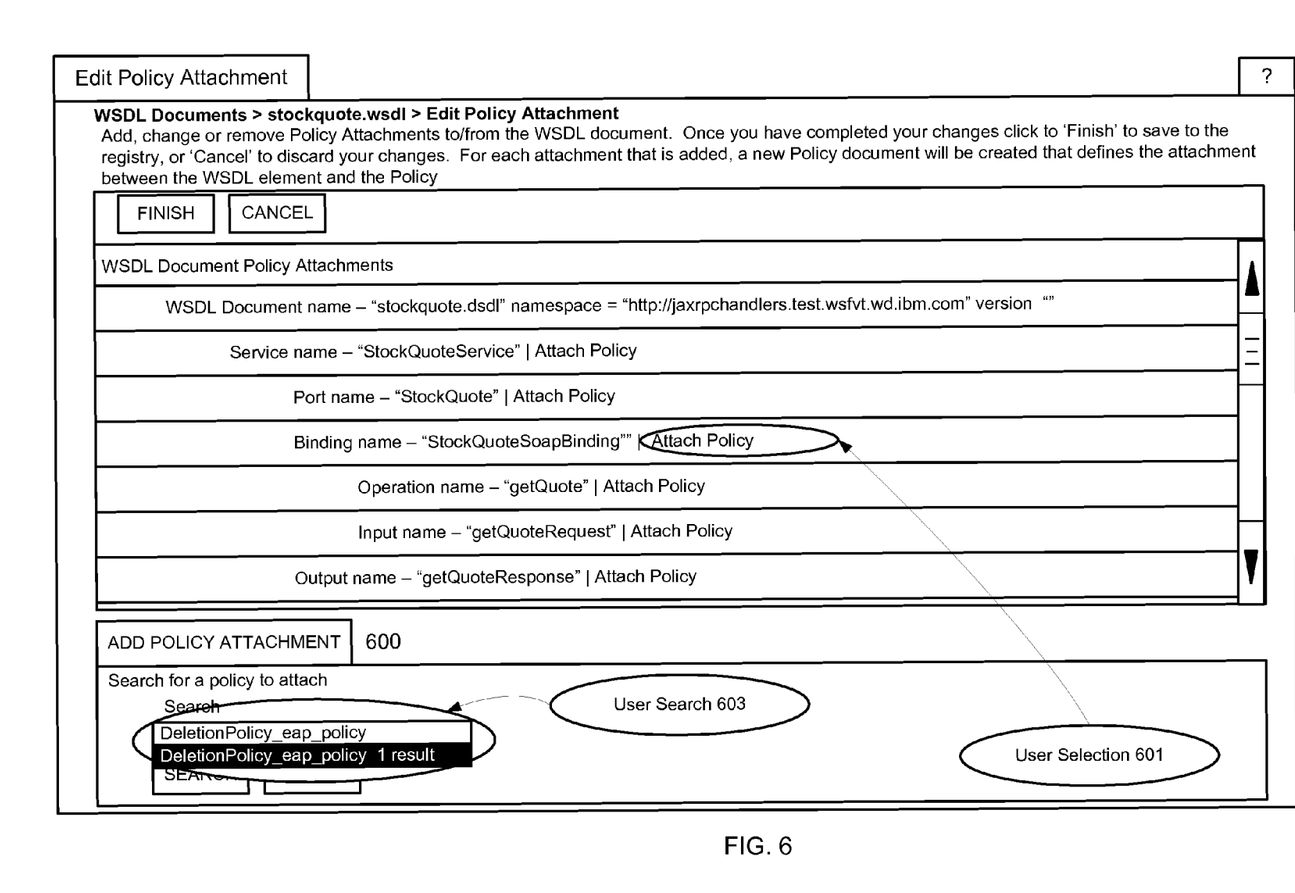
FIG. 6 shows an example WebSphere Service Registry and Repository screenshot of the Policy Attachment tool before an attachment is made, according to some example embodiments.

To illustrate, FIG. 6 shows an example WebSphere Service Registry and Repository screenshot of the Policy Attachment tool before an attachment is made, according to some example embodiments. The screen capture of FIG. 6 shows a source WSDL document that contains elements to which users want to attach policies. For each element there is an 'Attach Policy' link that when clicked, brings up the "Add Policy Attachment" window section 600. In this example, the user has selected 601 the document element with Binding name="StockQuoteBinding". In the "Add Policy Attachment window 600 the user has typed the first few letters of the policy name "Del" and a policy "DeletionsPolicy_eap_ policy" is selected from a drop down list of policies located by the policy editing tool. In this example, a "Policy Attachment" document is created joins the policy to the object. An example of a Policy Attachment document is:

```
<wsp:Policy>
    <wsp:PolicyAttachment>
        <wsp:AppliesTo>
            <wsrr:PolicySubjectQuery
wsrr:xpath="//WSDLPort[@bsrURI='a76022a7-8c73-
4322.8dd5.64c88364d5fb']"/>
        </wsp:AppliesTo>
        <wsp:PolicyReference URI="DeletionsPolicy_eap_policy"/>
    </wsp:PolicyAttachment>
</wsp:Policy>
```

Figure 7:
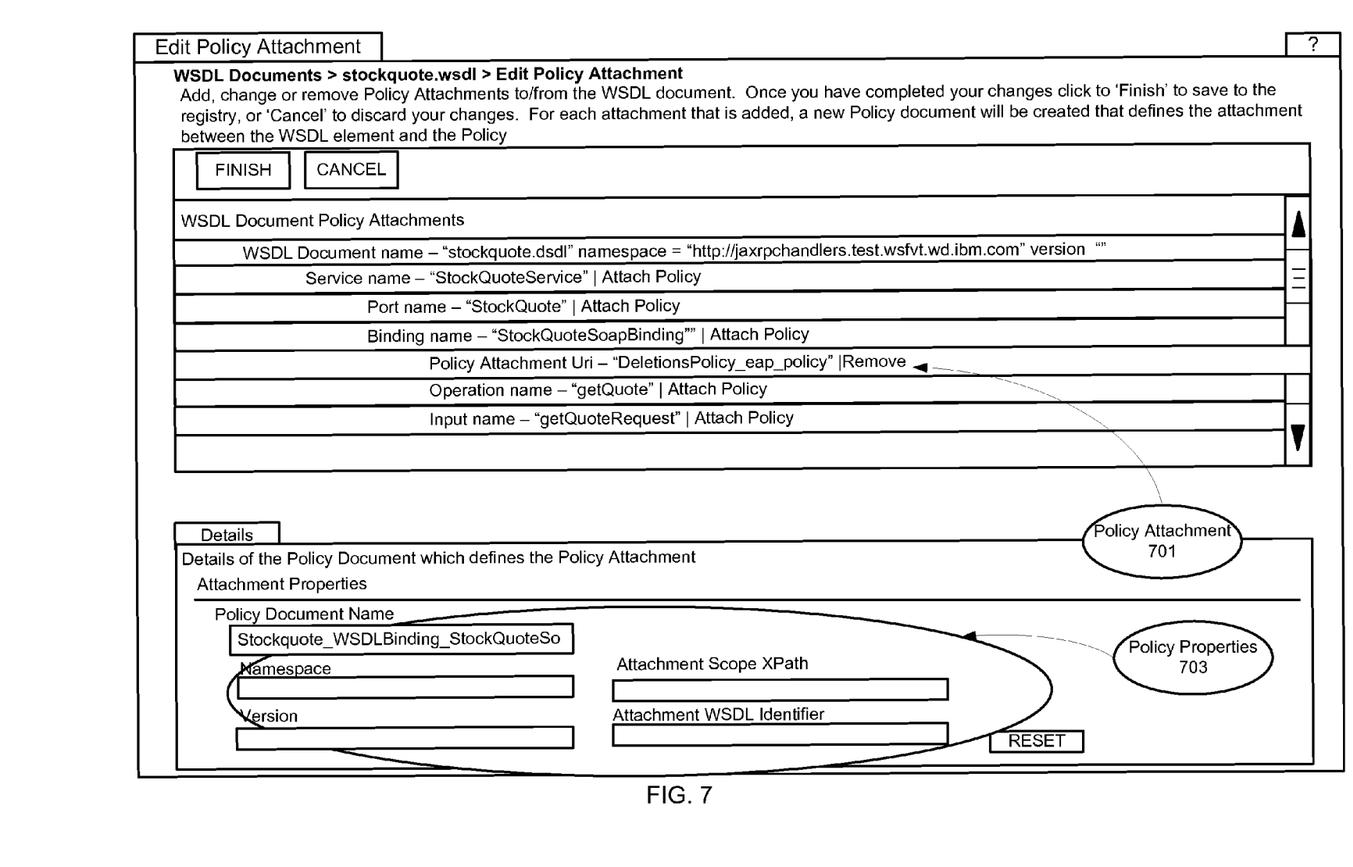
FIG. 7 shows the screenshot of FIG. 6 after the attachment is made, according to some example embodiments.

The meaning of this policy attachment document is that the policy identified by the <wsp:PolicyReference> will be attached to the WSDL element identified by the XPath expression in <wsrr:PolicySubjectQuery>. FIG. 7 shows the screenshot of FIG. 6 after the attachment is made, according to some example embodiments. The screen capture of FIG. 7 shows the list of documents elements with a Policy Attachment Document 701 attached to the previously selected element. A Policy Properties window 703 is displayed when the Policy Attachment document 701 is selected. Once the user has finished attaching policies to the WSDL elements they may click on "Finish".

Other Embodiments

It will be clear to one of ordinary skill in the art that all or part of the method of some example embodiments may suitably and usefully be embodied in a logic apparatus, or a plurality of logic apparatus, comprising logic elements arranged to perform the operations of the method and that such logic elements may comprise hardware components, firmware components or a combination thereof.

It will be equally clear to one of skill in the art that all or part of a logic arrangement according to some example embodiments can suitably be embodied in a logic apparatus comprising logic elements to perform the operations of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Some example embodiments can further suitably be embodied as a computer program product for use with a computer system. Such an implementation can comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web Some example embodiments can be realized in the form of a computer implemented method of deploying a service comprising steps of deploying computer program code operable to, when deployed into a computer infrastructure and executed thereon, cause the computer system to perform the operations of the method.

Some example embodiments can be realized in the form of a data carrier having functional data thereon, said functional data comprising functional computer data structures to, when loaded into a computer system and operated upon thereby, enable said computer system to perform the operations of the method.

It will be clear to one skilled in the art that many improvements and modifications can be made to the foregoing exemplary embodiment without departing from the scope of embodiments described herein.

Abbreviations

API Application Programming Interface
J2EE Java™ 2 Platform Enterprise Edition
OWL Web Ontology Language
SCA Service Component Architecture
SDO Service Data Object
SOA Service Oriented Architecture
SOAP Service Oriented Architecture Protocol
URI Uniform Resource Indicator
W3C (World Wide Web Consortium)
WS Web Service
WSDL Web Service Definition Language
WSRR IBM WebSphere Registry and Repository XML extensible mark-up language
XSD XML Schema Definition Notices IBM and WebSphere are registered trademarks or trademarks of International Business Machines Corporation in the United States and/or other countries. Java and all Java-based trademarks are trademarks of Sun Microsystems, Inc. in the United States, other countries, or both. Eclipse is a trademark of Eclipse Foundation, Inc.

What is claimed is:

1. A computer program product for Web Services policy attachment, the computer program product comprising:
    a non-transitory computer readable storage medium having computer readable program code embodied therewith, the computer readable program code configured to,
    receive a reference to a selected Web Services description document for Web Services policy attachment, the selected Web Services description document including at least one definition to describe a Web Service;
    locate a logical object of the selected description Web Services document that permits Web Services policy attachment;
    receive a reference to the logical object that is located for Web Services policy attachment;
    search for at least one policy among a plurality of policies for attachment to the logical object based on a type and properties of the logical object, wherein a set of the plurality of policies are configurable for attachment to the logical object based on the type of the logical object, wherein a smaller subset of the plurality of policies that is smaller than the set of the plurality of policies are configurable for attachment based on the properties of the object, wherein at least some policies in the plurality of policies not within the set of plurality of policies and the subset of the plurality of policies are not configurable for attachment to the logical object based on the type and the properties of the logical object;
    locate the at least one policy that is operable to be associated with the logical object that is referenced, wherein the at least one policy defines a rule for the Web Service, wherein as part of the locate of the at least one policy, the computer program code is configured to check the type and the properties of the logical object against an object type and object properties that the at least one policy accepts;
    receive a reference for a selected policy from among the at least one policy; and
    attach the selected policy to the selected Web Services description document.

2. The computer program product of claim 1, wherein the selected Web Services description document comprises a Web Services Definition Language document.

3. The computer program product of claim 1, wherein the computer program code is configured to create a policy attachment document that references the selected policy and the logical object, as part of attaching the selected policy to the selected Web Services description document.

4. The computer program product of claim 3, wherein the selected Web Services description document and the policy attachment document are stored in a service registry and repository.

5. The computer program product of claim 1, wherein the selected policy comprises a domain specific policy.

6. An apparatus comprising:
    a processor;
    a document reference receiver executable on the processor and operable to receive a reference to a selected Web Services description document for Web Services policy attachment, the selected Web Services description document including at least one definition to describe a Web Service;
    an object list builder executable on the processor and operable to locate a logical object of the selected Web Services description document that permits Web Services policy attachment;
    an attach policy receiver executable on the processor and operable to receive a reference to the logical object that is located for Web Services policy attachment;
    a policy locator executable on the processor and operable to,
        search for at least one policy among a plurality of policies for attachment to the logical object based on a type and properties of the logical object, wherein a set of the plurality of policies are configurable for attachment to the logical object based on the type of the logical object, wherein a smaller subset of the plurality of policies that is smaller than the set of the plurality of policies are configurable for attachment based on the properties of the object, wherein at least some policies in the plurality of policies not within the set of plurality of policies and the subset of the plurality of policies are not configurable for attachment to the logical object based on the type and the properties of the logical object; and
        locate the at least one policy that is operable to be associated with the logical object that is referenced, wherein the at least one policy defines a rule for the Web Service, wherein as part of the locate of the at least one policy, the computer program code is configured to check the type and the properties of the logical object against an object type and object properties that the at least one policy accepts;
    a policy receiver executable on the processor and operable to receive a reference for a selected policy from among the at least one policy; and
    a policy attacher executable on the processor and operable to attach the selected policy to the selected Web Services description document.

7. The apparatus of claim 6, wherein the selected Web Services description document comprises a Web Services Definition Language document.

8. The apparatus of claim 6, wherein the policy attacher is operable to create a policy attachment document that references the selected policy and the logical object, as part of attaching the selected policy to the selected Web Services description document.

9. The apparatus of claim 8, further comprising a service registry and repository that is operable to store the selected Web Services description document and the policy attachment document.

10. The apparatus of claim 6, wherein the selected policy comprises a domain specific policy.

* * * * *